US005665966A

United States Patent [19]

Dahl et al.

[11] Patent Number: 5,665,966

[45] Date of Patent: Sep. 9, 1997

[54] CURRENT MEASURING SYSTEM

[75] Inventors: David A. Dahl; Anthony D. Appelhans; John E. Olson, all of Idaho Falls, Id.

[73] Assignee: Lockheed Martin Idaho Technologies Company, Idaho Falls, Id.

[21] Appl. No.: 536,233

[22] Filed: Sep. 29, 1995

[51] Int. Cl.$^6$ .............................. B01D 59/44; H01J 49/00

[52] U.S. Cl. ....................... 250/281; 250/283; 313/103 R

[58] Field of Search .................................... 250/281, 282, 250/299, 283; 313/103 R

[56] References Cited

U.S. PATENT DOCUMENTS

| | | | |
|---|---|---|---|
| Re. 33,344 | 9/1990 | Stafford | 250/299 |
| 3,240,931 | 3/1966 | Wiley et al. | 250/299 |
| 3,370,171 | 2/1968 | Ohta | 250/299 |
| 3,639,757 | 2/1972 | Caroll et al. | 250/282 |
| 3,742,213 | 6/1973 | Cohen et al. | 250/282 |
| 4,093,855 | 6/1978 | Fite et al. | 250/282 |
| 4,988,867 | 1/1991 | Laprade | 250/283 |

*Primary Examiner*—Bruce Anderson

*Attorney, Agent, or Firm*—Wells St. John Roberts Gregory & Matkin

[57] ABSTRACT

A current measuring system comprising a current measuring device having a first electrode at ground potential, and a second electrode; a current source having an offset potential of at least three hundred volts, the current source having an output electrode; and a capacitor having a first electrode electrically connected to the output electrode of the current source and having a second electrode electrically connected to the second electrode of the current measuring device.

21 Claims, 4 Drawing Sheets

POWER SUPPLY
POWER SUPPLY
POWER SUPPLY
CONTROL CIRCUIT
26
32
34
36
38
40
42
44
46
48
50
51
52
54
56
58
60
62
64
66
68

CURRENT MEASURING SYSTEM

CONTRACTUAL ORIGIN OF THE INVENTION

The United States Government has rights in this invention disclosed under Contract Number DE-AC07-76ID01570 between the U.S. Department of Energy and EG&G Idaho, Inc., now Contract Number DE-AC07-94ID13223 with Lockheed Idaho Technologies Company.

TECHNICAL FIELD

The invention relates to measurement of very small currents.

BACKGROUND OF THE INVENTION

Various methods are employed to measure very small currents (e.g.; pico amps to nano amps). Such methods generally employ a current source (current limited by high effective internal resistance) that has large offset potentials (e.g.; ± a few thousand volts, either polarity). The output of the current source is coupled to a sensitive current measuring device, such as an electrometer operating in current mode. A problem is that an instrument such as an electrometer typically only has voltage offset capabilities of a few hundred volts, and must therefore be floated to a high voltage in order to be used with the current source.

One example of a current source employed in measuring small currents is an electron multiplier. Another example of a current source employed in measuring very small currents is a Faraday cup. Applicants' invention has application in embodiments including various types of current sources. Electron multipliers will be described by way of example only.

An electron multiplier is an apparatus comprising a tube in which current amplification is realized through secondary emission of electrons. Secondary emission of electrons occurs when the surface of a material is bombarded by high velocity primary ions. The energy of incident primary ions is usually sufficient to liberate several secondary ions per incident particle. The bombarded surface is called a secondary emitter. The electron multiplier comprises a tube. The electron multiplier further comprises, in the tube, a cathode (or first voltage application electrode), a collector (or second voltage application electrode) spaced apart from the input cathode, and an electron multiplication region in the tube between the cathode and collector. There are two general types of electron multipliers: discrete dynode multipliers, and continuous dynode multipliers.

In discrete dynode electron multipliers, the electron multiplication region is defined by a plurality of discrete dynodes (anodes). The anodes are located in the tube between the cathode and the collector, on alternating sides of the tube. The anodes are made of a material which makes a good secondary emitter. A very high voltage is applied to the collector. A lower voltage is applied to the anode closest to the output collector. The voltage applied to the anode closest to the output collector is higher than a voltage applied to the anode which is second closest to the output collector, which is higher than a voltage applied to the anode which is third closest to the output collector, etc. In operation, electrons are accelerated through the tube by potential differences from one location of the tube to the next. For example, electrons are accelerated by the potential applied to the anode closest to the cathode (first anode), which is a high potential. When the electrons impact the first anode, a greater number of electrons is produced because the anodes are good secondary emitters. These electrons are accelerated by the next anode, which is at a higher potential than the previous anode, and by each subsequent anode, which are at increasingly higher potentials. A large output pulse is produced at the collector.

Continuous dynode multipliers operate on a similar principle, but do not include separate, discrete anodes. Instead, a tube of lead silicate glass is processed to exhibit electrical conductivity and secondary emission properties. The processed lead silicate glass defines a semiconducting layer. A first voltage is applied to the semiconducting layer at one end of the tube, and a second voltage is applied to the semiconducting layer at the other end of the tube. An example of a continuous dynode multiplier is a 4000 Series Channeltron (TM) electron multiplier manufactured by Galileo Electro-Optics Corporation (previously manufactured by the Electro-Optics Division of Bendix Corporation).

Electron multipliers can be operated in either an analog mode, or a pulse counting mode. Most are operated in analog mode. The difference between electron multipliers operating in pulse counting mode and electron multiplier operating in analog mode is that in pulse counting mode output pulses are produced with a characteristic output, whereas electron multipliers operating in analog mode have a very wide distribution of output pulse amplitudes that generally overlap due to the higher counting rates of analog multipliers.

Electron multipliers require that the exit end be biased much more positive (e.g., 1500–5000 volts more positive) than the entrance or cathode.

Electron multipliers, such as Galileo electron multipliers, are employed in measuring ions. When it is desired to measure negative ions, a sensitive current measuring device, such as an electrometer in current mode is connected to the collector of an electron multiplier. An electrometer is a device that measures potential difference or electric charge by sensing mechanical forces that exist between bodies that possess electrostatic charges. In order to be able to connect the electrometer to the output of the electron multiplier (without having to float the electrometer at a potential above ground), the collector of the electron multiplier is held generally at ground, and a very negative voltage is applied to the cathode. Because the voltage at the cathode is negative, an external conversion dynode is required at the entrance of the electron multiplier to convert negative ions to positive ions, and a very high positive voltage is applied to the dynode. Negative ions impact this dynode, and kick off positive secondary ions into the electron multiplier. The positive secondary ions are attracted to the electron multiplier and produce secondary electrons on impact. The sensitivity of the dynode method depends on the efficiency of positive ion production.

It is desirable to measure negative ions for various reasons. For example, it is useful to measure negative ions in mass spectrometry. Mass spectrometry, and the use of electron multipliers, is discussed in detail in chapter 18 of "Principles of Instrumental Analysis", Third Edition, Douglas A. Skoog, Saunders College Publishing, 1985.

Mass spectrometry is used, for example, to determine the structure of a molecule. In mass spectrometry, molecules of a sample are broken up into constituent parts (fragments) by collision with streams of electrons, ions, fast atoms, or photons (alternatively, fragmentation can be achieved thermally, or by applying a high electrical potential). Some of the resulting fragments are negative ions and some are positive ions. Either the positive or the negative ions are removed (e.g., by drawing the positive or negative ions through a slit in a mass analyzer, described below, using a large positive or negative potential). Each kind of ion has a particular mass to charge ratio (m/e ratio). Most ions have a charge of 1, and the mass to charge ratio is therefore simply the mass of the ion.

A mass analyzer receives the positive or negative ions and disperses them based upon the mass of the ions. Ions of a given mass are supplied to an electron multiplier.

The electron multiplier is used with the mass analyzer so that a signal representative of the relative abundance of each ion is produced. The intensity at the output of the electron multiplier indicates the abundance of an ion introduced into the electron multiplier. A plot or list of the intensities of each mass to charge ratio can be produced, and that plot or list is referred to as a mass spectrum.

A mass spectrum is highly characteristic of a particular compound. The mass spectrum can be used to assist in determining the structure of an unknown molecule, or to determine whether two molecules are identical to one another.

It should be noted that there are various types of mass analyzers, such as magnetic sector analyzers (single focusing or double focusing), quadrupole analyzers, and time of flight analyzers. The invention has application with any type of mass analyzer.

In a sector analyzer, a permanent magnet or electromagnet is used to cause an ion beam to be deflected into a circular path in an analyzer tube which is under vacuum and which has a slitted outlet leading to an electron multiplier. At the inlet of the tube is an ionization chamber including first and second spaced apart slitted walls which ions must pass through in sequence to reach the analyzer tube. Different mass particles can be selected for focusing on the outlet slit by varying the field strength of the magnet or the accelerating potential between the first and second slitted walls.

In a quadrupole analyzer, an ion source creates a beam of ionized particles. A quadrupole analyzer employs four short, parallel metal rods arranged symmetrically around the beam of ionized particles. Opposed rods are electrically connected such that one pair of rods is attached to the positive side of a variable DC source, and the other pair of rods is attached to the negative side of the variable DC source. Variable radio frequency AC signals, 180° out of phase, are also applied to each pair of rods. Neither the DC nor the AC accelerates particles ejected from the ion source. The combined field effect, however, causes the particles to oscillate about their respective central axis of travel, and only those with a given range of mass to charge ratios can pass through the array without being removed by colliding into one of the rods. Bass scanning is achieved by varying the frequency of the ac supply while holding the potentials constant or by varying the potentials of both the AC and DC sources while keeping their ratio and the frequency constant.

In a time of flight analyzer, ions are produced intermittently by bombardment with pulses. The produced ions are accelerated by an electrical field pulse that has the same frequency as the ionization pulse, but which lags behind the ionization pulse. The accelerated particles pass into a field free drift tube which leads to the electron multiplier. Because all particles entering the drift tube have the same kinetic energy, their velocities in the drift tube varies inversely with their respective masses. Lighter particles arrive at the electron multiplier earlier than the heavier ones. The electron multiplier is used to determine the relative intensity of the various ions, and time of travel in the drift tube is used to determine the relative mass of various ions.

It is also useful to measure negative ions in another type of mass spectrometer, called an ion trap mass spectrometer. Ion trap mass spectrometers generally include trapped ion analyzer cells. Gaseous sample molecules are ionized in the center analyzer cell by electrons that are accelerated from a filament to a collector. A pulsed voltage is applied to a grid at the filament to switch the beam on and off periodically. Ions formed while the beam is on are trapped within the cell for a few seconds. The ions are held in place by an electrostatic well created by applying AC voltages to end caps and a ring electrode. The ions are accelerated out of the cell and into an electron multiplier which is connected to a preamplifier which amplifies the current.

Ion detection and mass spectrometry are discussed in U.S. Pat. No. 3,774,028 issued to Daly on Nov. 20, 1973; U.S. Pat. No. 3,898,456 issued to Dietz on Aug. 5, 1975; U.S. Pat. No. 4,267,448, issued May 12, 1981 to Feser et al.; U.S. Pat. No. 4,423,324 issued to Stafford on Dec. 27, 1983; and U.S. Pat. No. 4,808,818, issued to Jung on Feb. 28, 1989, all of which are incorporated herein by reference.

It is useful to measure negative ions in various other applications, such as in SIMS. A SIMS (Secondary Ion Mass Spectroscopy) system employs an ion beam (ion microprobe) to sputter material, in the form of secondary ions, from the surface of a sample such as a semiconductor, to detect impurities in the surface of the sample. The secondary ions are electrostatically accelerated and analyzed using a mass spectrometer as described above. Most of the secondary ions are emitted from the two top atomic layers of the sample. A depth profile of a sample can be obtained, in a destructive analysis technique, by sputtering the sample continuously in a vertical direction. Accuracy decreases, however, as depth increases.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention provides a current measuring system comprising a current measuring device having a first electrode at ground potential, and a second electrode; a current source having an offset potential of at least three hundred volts, the current source having an output electrode; and a capacitor having a first electrode electrically connected to the output electrode of the current source and having a second electrode electrically connected to the second electrode of the current measuring device.

Applicants' invention has various embodiments involving measurement of very small currents. One such embodiment is an ion detection system. A more particular embodiment is a mass spectrometer including an ion detection system. A mass spectrometer including an ion detection system will now be described by way of example. It should be kept in mind, however, that applicants' invention is not limited to application in ion detection systems.

Figure 1:
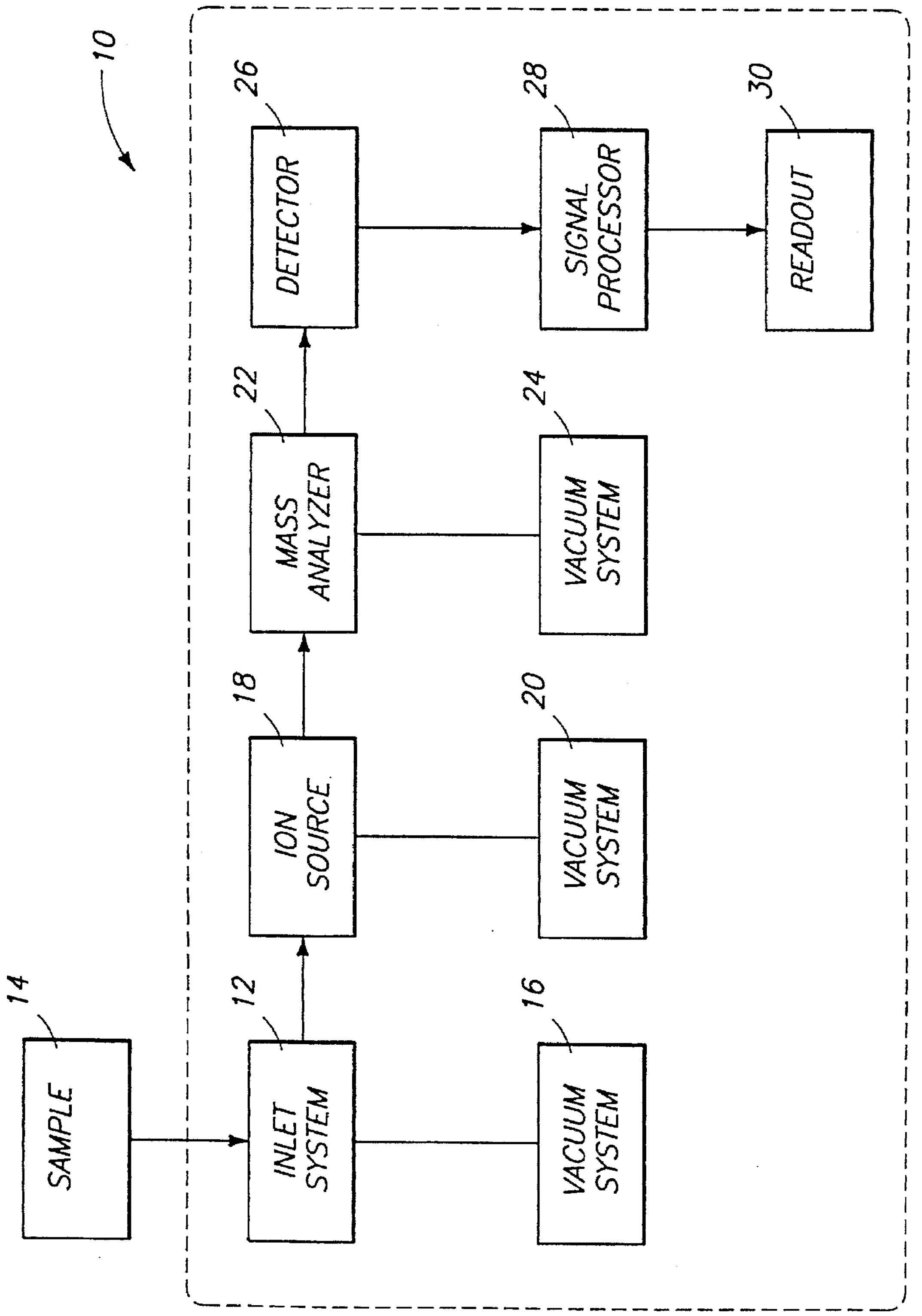
FIG. 1 is a block diagram of a mass spectrometer embodying the invention.

FIG. 1 illustrates a mass spectrometer 10 in accordance with one embodiment of the invention. The mass spectrometer 10 includes an inlet system 12, which receives a sample 14 to be analyzed, and includes a vacuum system 16 which applies a vacuum to the inlet system 12. Any appropriate inlet system can be employed for the inlet system 12. For example, the inlet system 12 can be a batch inlet system, a direct probe inlet system, a gas chromatographic inlet system, or a liquid chromatographic inlet system. The purpose of the inlet system is to introduce the sample 14 into an ion source with minimal loss of vacuum.

The mass spectrometer 10 further includes means for ionizing a sample into fragments. In the illustrated embodiment, the ionizing means comprises ion source 18, and the mass spectrometer 10 further includes a vacuum system 20 which applies a vacuum to the ion source 18. Any appropriate ion source can be employed for the ion source 18. For example, the ion source 18 can be an electron impact source (EI), which employs energetic electrons to cause fragmentation, a field ionization (FI) source, which employs a high potential electrode to cause fragmentation of a sample in gas phase, a field desorption source (FD), which employs a high potential electrode to cause fragmentation of a sample in solid, liquid, or gas phase, a chemical ionization source (CI), which employs reagent positive ions, a fast atom bombardment source (FAB), which employs energetic ions, an ion beam of a secondary ion mass spectrometry system (SIMS), a plasma desorption source (PD), which employs high energy fission fragments, a thermal desorption source, which employs heat, a laser desorption source (LD), which employs a laser beam, or a electrohydrodynamic ionization source (EHMS), which employs a high field.

The mass spectrometer 10 further comprises means for separating charge fragments based on charge to mass ratio. In the illustrated embodiment, the fragment separating means comprises a mass analyzer 22, receiving fragments from the ion source 18. The mass analyzer 22 resolves ions of different mass to charge ratios. The mass spectrometer 10 further includes a vacuum system 24 which applies a vacuum to the mass analyzer 22. Any appropriate mass analyzer can be employed for the mass analyzer 22. For example, the mass analyzer 22 can be a single focusing magnetic sector analyzer, a double focusing analyzer, a quadrupole analyzer, or a time of flight analyzer. Such mass analyzers are discussed in detail, above, in the Background of the Invention. The mass analyzer 22 receives the ions from the ion source 18, and disperses them based upon the mass of the ions. Each kind of ion has a particular mass to charge ratio. Most ions have a charge of 1, and the mass to charge ratio is therefore the mass of the ion. Thus, the mass analyzer can be used to determine the mass, and therefore the kind of ion, for various fragments produced by the ion source 18.

The mass spectrometer 10 further includes a current source or detector 26 receiving ions of a given mass from the mass analyzer 22. The detector 26 is shown in greater detail in FIG. 2. The mass spectrometer 10 further includes a signal processor 28 receiving electrical signals from the detector 26, and the mass analyzer 22 (FIG. 1). The mass spectrometer 10 further includes a read-out 30, which is a printer, monitor, or other communication device, and which communicates to a user mass spectrum data compiled by the signal processor 28. The mass spectrum data can be in the form of a table, a graph, a plot, chemical formulas or diagrams, or in any other suitable form.

Figure 2:
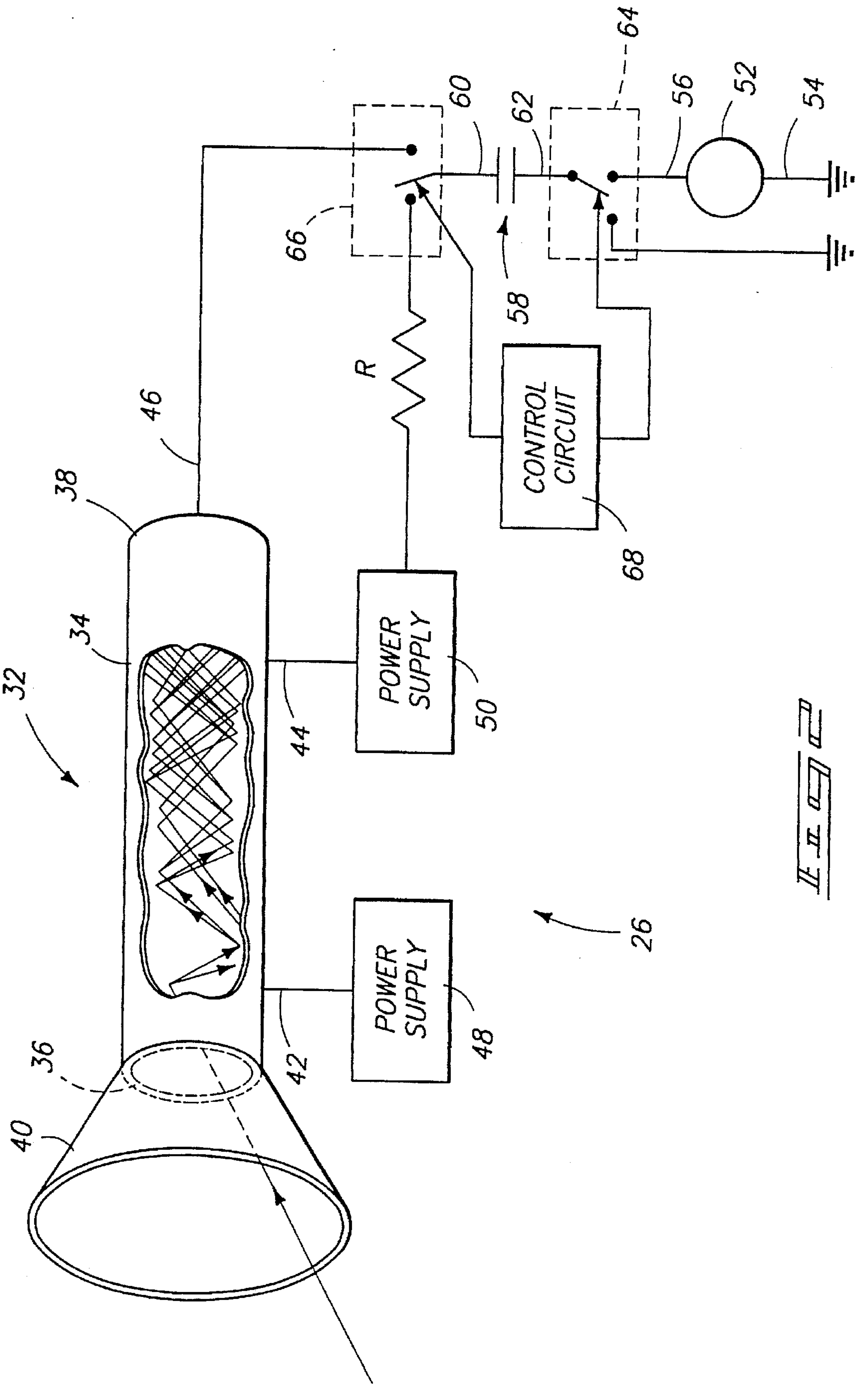
FIG. 2 is a perspective view, partially broken away, of a detector included in the mass spectrometer of FIG. 1.

Referring now to FIG. 2, the current source or detector 26 will be described in more detail. The detector 26 includes an electron multiplier 32 operating in analog mode (as opposed to pulse counting mode). The electron multiplier 32 is either a discrete dynode multiplier, or a continuous dynode multiplier. Discrete multipliers, and continuous dynode multipliers are discussed in detail, above, in the Background of the Invention. The electron multiplier 32 includes a tube 34 having an input end 36 (ion input) and a signal end 38. The electron multiplier 32 includes an ion input horn 40 which directly receives negative ions from the mass analyzer 22. No external conversion dynode is employed. The ion input horn 40 directs ions into the tube 34. The electron multiplier 32 further includes a first voltage application electrode 42 proximate the input end 36, and a second voltage application electrode 44 proximate the signal end 38. The electron multiplier 32 further includes a output detection electrode 46 where output pulses are produced. The first voltage application electrode 42 is closer to the ion input 36 than to the output detection electrode 46, and the second voltage application electrode 44 is closer to the output detection electrode 46 than to the ion input 36.

The detector 26 further includes a first power supply 48 supplying a first positive voltage to the first voltage application electrode 42. The detector 26 further includes a second power supply 50 providing a second positive voltage, greater than the first positive voltage, to the second voltage application electrode 44. For example, in one embodiment, the power supply 48 provides a voltage of positive 1,000 volts to the first voltage application electrode. Any appropriate positive voltages can be supplied by the power supplies 50 and 48, as long as there is a sufficient voltage differential between the first voltage application electrode 42 and the second voltage application electrode 44 to cause an electron multiplication effect. The voltage differential can be the voltage differential recommended by the manufacturer of the particular electron multiplier 32 employed.

The detector further includes a current measuring device 52 having a first electrode 54 at ground potential, and a second electrode 56. Any sensitive current measuring device can be employed. In the illustrated embodiment, the current measuring device 52 comprises an electrometer.

The detector 26 further comprises a high voltage capacitor 58. The capacitor 58 has a first electrode 60 electrically connected to the output detection electrode 46 of the electron multiplier 32. The capacitor 58 further has a second electrode 62 electrically connected to the second electrode 56 of the current measuring device 52.

Figure 3:
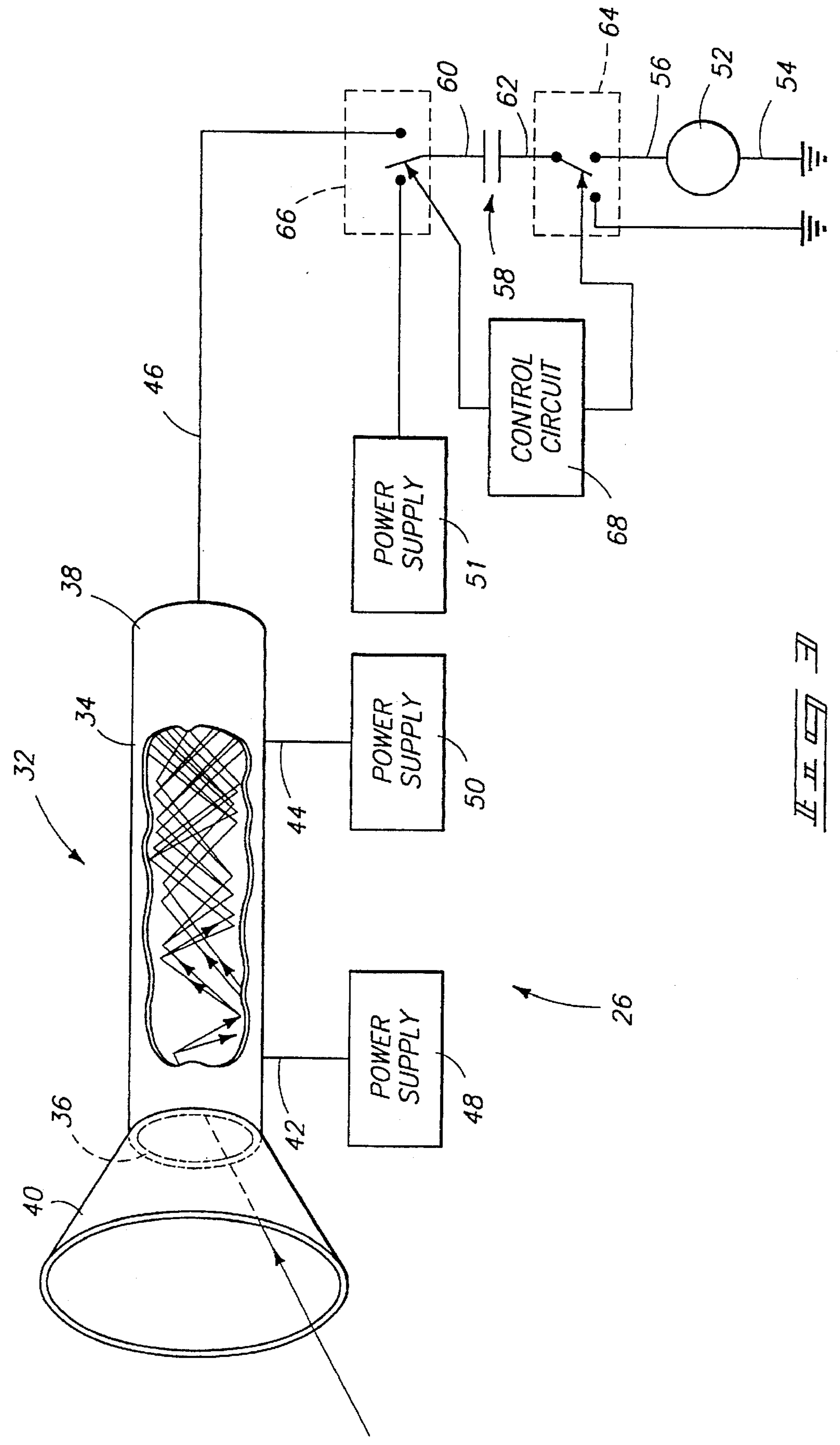
FIG. 3 is a perspective view, partially broken away, of a detector in accordance with an alternative embodiment of the invention.

The detector 26 further comprises means for recharging the capacitor 58. In the illustrated embodiment, the recharging means comprises means for connecting the capacitor 58 to the second positive voltage (i.e, the voltage supplied by the power source 50), via resistor R. In an alternative embodiment, the means for recharging the capacitor 58 comprises means for connecting the capacitor to a voltage greater than the second positive voltage. In such an alternative embodiment, either a separate power supply 51 is provided to recharge the capacitor 58 (FIG. 3), or the voltage supply 50 is adjusted to provide a voltage that is higher than intended to be provided to the second voltage application electrode 44, which higher voltage is employed to recharge the capacitor 58, and a voltage drop (not shown)is provided between the voltage supply 50 and the second voltage application electrode 44.

In the illustrated embodiment, the recharging means comprises a first high voltage switch 64 (such as a magnetic reed switch or similar switch) selectively disconnecting the first electrode of the capacitor 58 from the current measuring device 52 and instead connecting the second electrode 62 of the capacitor 58 to ground, and a second high voltage switch 66 (such as a magnetic reed switch or similar switch). The second switch 66 selectively disconnects the first electrode 60 of the capacitor 58 from the output detection electrode 46 and instead connects the first electrode 60 of the capacitor 58 to a high voltage. The second switch 66 is in synchronization with the first switch 64 for connecting the capacitor 58 in either a recharging mode or a measurement mode. More particularly, the second switch 66 periodically disconnects the first electrode 60 of the capacitor 58 from the output detection electrode 46 and instead connects the first electrode 60 of the capacitor 58 to a high voltage in synchronization with the first switch 64 disconnecting the second electrode 62 of the capacitor 58 from the current measuring device 52 and instead connecting the second electrode 62 of the capacitor 58 to ground. The first and second high voltage switches 64 and 66 that are employed are selected for low current leakage.

In the illustrated embodiment, the detector further includes a control circuit 68, including a timer, which periodically simultaneously switches both the first and second switches 64 and 66. The switching cycle for the control circuit 68 is set based upon the estimated amount of time for discharging and recharging of the capacitor 58; e.g. the control circuit connects the capacitor 58 to the high voltage for recharging after a certain amount of time (e.g., one half hour) of use in the measurement mode, and reconnects the capacitor 58 in the measurement mode after the capacitor 58 has been recharged. In an alternative embodiment, the control circuit 68 communicates with the electrometer 52, includes an integrator which integrates current measured by the electrometer 52 over time to determine when the capacitor will be discharged, and connects the capacitor 58 for recharging just before the capacitor is discharged.

Thus, a detector for detecting negative ions has been disclosed which directly receives negative ions, without the need for an external conversion dynode, and also without having to float the current measuring device.

Figure 4:
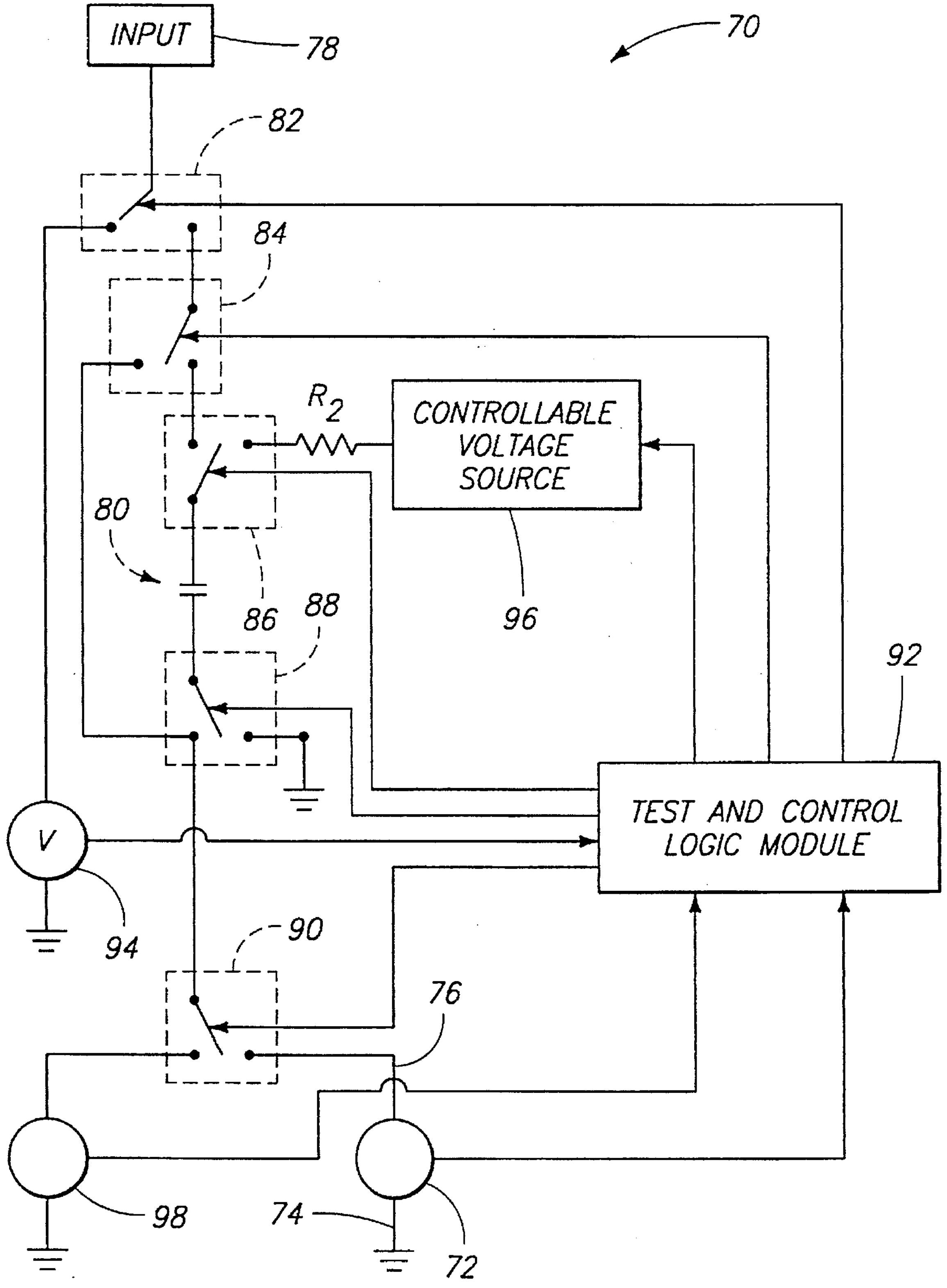
FIG. 4 is a block diagram of an electrometer in accordance with an alternative embodiment of the invention.

The invention is not limited to application in ion detectors. The invention has application in any system measuring small currents and employing a current source that has large offset potentials (e.g.; ± more than three hundred volts, more particularly, ± a few thousands volts, either polarity). For example, FIG. 4 illustrates an intelligent electrometer system 70 in accordance with an alternative embodiment of the invention.

The electrometer system 70 includes an electrometer 72 in current mode, and the system 70 includes automatic protection circuitry which protects the electrometer 72 against offset potentials. The electrometer 72 is substantially identical to the electrometer 52 shown in FIG. 2. The electrometer 72 has a first terminal 74 connected to ground and a second terminal 76 (FIG. 4). The system 70 includes an input 78 which is selectively connected to the terminal 76 of the electrometer 72. In operation, the input 78 is connected to an external current source when it is desired to measure current flowing from the external current source.

The electrometer system 70 further includes a high voltage capacitor 80, and switches 82, 84, 86, 88, and 90 selectively connecting the capacitor 80 between the input 78 and the electrometer 72. The electrometer system 70 further includes a test voltmeter 94 which is selectively connected to the input 78. The electrometer system 70 further includes a controllable (variable) voltage source 96 and resistor R2 connected to the voltage source 96. The voltage source 96 and resistor R2 are selectively used to charge the capacitor 80 to the offset potential measured by the voltmeter 94, or other desirable voltage.

The electrometer system further includes a test and control logic module 92 which controls the switches 82, 84, 86, 88, and 90. The test and control logic module 92 initially connects the voltmeter 82 to the input 78, using switch 82, and determines, using the voltmeter 94, if there is an offset potential (voltage) at the input 78 that exceeds a predetermined maximum offset potential. In the illustrated embodiment, the predetermined offset potential is the capability of the electrometer 72 or less. In one embodiment, the predetermined offset potential is less than one thousand volts. More particularly, the predetermined threshold is a few hundred volts. If there is an offset potential that exceeds the predetermined offset potential, the test and control logic module connects the capacitor 80 between the controllable voltage source 96 and ground for charging, using switches 86 and 88, and then connects the capacitor 80 in series between the input 78 and the switch 90 using switches 82, 84, 86, and 88. If the offset potential does not exceed the predetermined offset potential, the test and control logic module 92 causes the capacitor 80 to be bypassed, using switch 84 and connects the switch 90 to the input 78 using switch 82.

In one embodiment of the invention, the electrometer system 70 further includes a self protecting current measuring tester 98. The test and control logic module 92 connects the input 78 to the self protecting current measuring tester 98, using switch 90, and ensures that the current at the input 78 is a low current, before connecting the electrometer 72 to the input 78 (either via the capacitor, or directly). If the measured current at the input 78 exceeds a predetermined threshold (e.g., the capability of the electrometer 72 or lower), the test and control logic module 92 does not connect the electrometer 72 to the input 78.

In the illustrated embodiment of the invention, the test and control logic module 92 further includes an integrator communicating with the electrometer 72, which integrates the current measured by the electrometer 72 over time and connects the capacitor 80 for recharging based on the integrated current (e.g., when it is determined that the capacitor is discharged, or just before the capacitor 80 is discharged), if the capacitor 80 is in use. In an alternative embodiment, the test and control logic module 92 includes a timer and periodically connects the capacitor 80 for recharging after each session of a predetermined amount of time in use.

Thus, an electrometer system has been disclosed that includes offset potential protection circuitry.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A current measuring system comprising:

a current measuring device having a first electrode at ground potential, and a second electrode;

a current source having an offset potential of at least three hundred volts, the current source having an output electrode; and a capacitor having a first electrode electrically connected to the output electrode of the current source and having a second electrode electrically connected to the second electrode of the current measuring device.

2. A current measuring system in accordance with claim 1 wherein the current measuring device comprises an electrometer, and wherein the current measuring system further comprises a voltmeter measuring the offset potential, and a test and control logic module communicating with the voltmeter and connecting the capacitor in series between the electrometer and the current source if the offset potential measured by the voltmeter exceeds a predetermined threshold.

3. A current measurement system in accordance with claim 2 wherein the potential between the second voltage application electrode and the first voltage application electrode is at least 1500 volts.

4. A current measuring system in accordance with claim 1 wherein the current source comprises an analog electron multiplier having an ion input, a first voltage application electrode closer to the ion input than to the output electrode, and a second voltage application electrode closer to the output detection electrode than to the ion input, and wherein negative ions are supplied directly to the ion input, whereby there is no need to employ a dynode external to the electron multiplier to convert negative ions to positive ions.

5. A current measuring system in accordance with claim 4 wherein the first voltage application electrode is connected to a first positive voltage, and wherein the second voltage application electrode is connected to a second positive voltage more positive than the first positive voltage.

6. A current measuring system in accordance with claim 1 and further comprising means for recharging the capacitor.

7. A current measuring system in accordance with claim 6 wherein the current source comprises an analog electron multiplier having an ion input, a first voltage application electrode, and a second voltage application electrode, wherein negative ions are supplied directly to the ion input, wherein the first voltage application electrode is connected to a first positive voltage, wherein the second voltage application electrode is connected to a second positive voltage more positive than the first positive voltage, and wherein the means for recharging the capacitor comprises means for connecting the capacitor to the second positive voltage.

8. A current measuring system in accordance with claim 6 wherein the current source comprises an analog electron multiplier having an ion input, a first voltage application electrode, and a second voltage application electrode, wherein negative ions are supplied directly to the ion input, wherein the first voltage application electrode is connected to a first positive voltage, wherein the second voltage application electrode is connected to a second positive voltage more positive than the first positive voltage, and wherein the means for recharging the capacitor comprises means for connecting the capacitor to a voltage greater than the second positive voltage.

9. A current measuring system in accordance with claim 1 wherein the current measuring device comprises an electrometer.

10. A current measuring system in accordance with claim 1 and further comprising a switch selectively connecting the first electrode of the capacitor to either the output electrode, or to a high voltage for recharging of the capacitor.

11. A current measuring system in accordance with claim 1 and further comprising means for automatically periodically recharging the capacitor.

12. A current measuring system in accordance with claim 10 wherein the means for automatically periodically recharging the capacitor comprises a first high voltage magnetic reed switch periodically disconnecting the second electrode of the capacitor from the current measuring device and instead connecting the second electrode of the capacitor to ground, and a second high voltage magnetic reed switch periodically, in synchronization with the first magnetic reed switch, disconnecting the first electrode of the capacitor from the output detection electrode and instead connecting the first electrode of the capacitor to a charging voltage.

13. A mass spectrometer comprising:

means for ionizing a sample to produce charged fragments including negative ions;

means for separating the charged fragments based on charge to mass ratio;

an analog electron multiplier including a tube, including a first voltage application electrode connected to a first positive voltage, including an ion input horn directly receiving negative ions and directing them into the tube, including a second voltage application electrode connected to a second positive voltage greater than the first positive voltage, and including an output detection electrode;

an electrometer having a first electrode at ground potential, and a second electrode; and a capacitor having a first electrode electrically connected to the output detection electrode of the electron multiplier and having a second electrode electrically connected to the second electrode of the electrometer, whereby there is no need to employ a dynode external to the electron multiplier to convert negative ions to positive ions.

14. A mass spectrometer in accordance with claim 13 and further comprising means for recharging the capacitor.

15. A mass spectrometer in accordance with claim 14 wherein the means for recharging the capacitor comprises means for connecting the capacitor to the second positive voltage.

16. A mass spectrometer in accordance with claim 13 and further comprising a switch selectively connecting the first electrode of the capacitor to either the output detection electrode, or to a high voltage for recharging of the capacitor.

17. A mass spectrometer in accordance with claim 13 and further comprising means for automatically periodically recharging the capacitor.

18. A mass spectrometer in accordance with claim 13 and further comprising a first high voltage magnetic reed switch periodically disconnecting the second electrode of the capacitor from the electrometer and instead connecting the second electrode of the capacitor to ground, and a second high voltage magnetic reed switch periodically, in synchronization with the first magnetic reed switch, disconnecting the first electrode of the capacitor from the output detection electrode and instead connecting the first electrode of the capacitor to a high voltage.

19. A mass spectrometer in accordance with claim 13 wherein a potential of positive 2500 volts is applied to the second voltage application electrode, and wherein a potential of positive 1000 volts is applied to the first voltage application electrode.

20. A method of detecting negative ions, the method comprising:

providing an electron multiplier having a first voltage application electrode, having a second voltage application electrode, having an ion input, and having an output detection electrode;

operating the electron multiplier in analog mode;

applying appropriate voltages to the first voltage application electrode, and the second voltage application electrode, such that the electron multiplier is capable of directly receiving negative ions at the ion input and generating an output signal at the output detection electrode;

providing a capacitor having a first plate connected to the output detection electrode and having a second plate;

coupling an electrometer between the second plate of the capacitor and a ground potential; and coupling the ion input directly to a source of negative ions.

21. A method of mass spectrometry comprising:

ionizing a sample to produce charged fragments including negative ions;

separating the charged fragments based on charge to mass ratio;

providing an analog electron multiplier including a tube, including a first voltage application electrode connected to a first positive voltage, including an ion input horn, including a second voltage application electrode connected to a second positive voltage greater than the first positive voltage, and including an output detection electrode;

directing separated negative ions into the tube;

providing an electrometer having a first electrode at ground potential, and a second electrode, and outputting a signal used for generating mass spectrum data; and providing a capacitor having a first electrode electrically connected to the output detection electrode of the electron multiplier and having a second electrode electrically connected to the second electrode of the electrometer.

* * * * *